(12) United States Patent
Degtiarev et al.

(10) Patent No.: US 12,205,255 B1
(45) Date of Patent: Jan. 21, 2025

(54) PERSONALIZED AVATARS USING TEXT DESCRIPTION OF FEATURES

(71) Applicant: Glam Labs, Inc., San Francisco, CA (US)

(72) Inventors: Roman Degtiarev, Tbilisi (GE); Tikhon Vorobev, Saint Petersburg (RU); Vadim Titov, Moscow (RU)

(73) Assignee: Glam Labs, Inc., San Francisco, CA (US)

( * ) Notice: Subject to any disclaimer, the term of this patent is extended or adjusted under 35 U.S.C. 154(b) by 0 days.

(21) Appl. No.: 18/775,533

(22) Filed: Jul. 17, 2024

Related U.S. Application Data

(63) Continuation-in-part of application No. 18/748,397, filed on Jun. 20, 2024.

(51) Int. Cl.
| | | |
|---|---|---|
| *G06V 10/82* | (2022.01) | |
| *G06T 5/60* | (2024.01) | |
| *G06T 5/70* | (2024.01) | |
| *G06V 40/16* | (2022.01) | |

(52) U.S. Cl.
CPC .............. *G06T 5/60* (2024.01); *G06T 5/70* (2024.01); *G06V 10/82* (2022.01); *G06V 40/171* (2022.01); *G06T 2207/20081* (2013.01); *G06T 2207/20084* (2013.01); *G06T 2207/30201* (2013.01)

(58) Field of Classification Search
CPC ... G06T 5/60; G06T 5/70; G06T 2207/20081; G06T 2207/20084; G06T 2207/30201; G06V 10/82; G06V 40/171
See application file for complete search history.

(56) References Cited

U.S. PATENT DOCUMENTS

| 11,922,550 B1 * | 3/2024 | Ramesh | ................ G06F 40/284 |
| 2024/0135611 A1 * | 4/2024 | Costin | ................... G06T 11/60 |

OTHER PUBLICATIONS

Zhang et al. "Adding Conditional Control to Text-to-Image Diffusion Models", Nov. 26, 2023. (Year: 2023).*

* cited by examiner

*Primary Examiner* — Phuoc Tran
(74) *Attorney, Agent, or Firm* — Georgiy L. Khayet

(57) ABSTRACT

Systems and methods for generating personalized avatars using text description of features are provided. An example method includes receiving a first image that includes a face, acquiring a text including a first prompt for stylization of the first image, generating a second prompt concerning the face, combining the first prompt and the second prompt into a third prompt, encoding the third prompt into a text embedding, encoding the first image into an image embedding, randomly generating a first noise for the image embedding, adding the first noise to the image embedding to obtain a noisy image embedding, providing the noisy image embedding and the text embedding to a first neural network to generate a second noise, modifying the noisy image embedding based on the second noise, and decoding, using a second neural network, the noisy image embedding into a second image including the face stylized according to the third prompt.

16 Claims, 9 Drawing Sheets

PERSONALIZED AVATARS USING TEXT DESCRIPTION OF FEATURES

CROSS-REFERENCE TO RELATED APPLICATIONS

This application is a Continuation-in-Part of, and claims the priority benefit of, U.S. patent application Ser. No. 18/748,397, filed on Jun. 20, 2024, and entitled "AI-DRIVEN PHOTO STYLIZATION WITH TEXT DESCRIPTION TUNING." The subject matter of the aforementioned application is incorporated herein by reference in its entirety.

TECHNICAL FIELD

This disclosure generally relates to image processing. More particularly, this disclosure relates to systems and methods for generating personalized avatars using text description of their features.

BACKGROUND

Artificial Intelligence (AI)-based creation of personalized avatars from user images is widely utilized in various applications, including video chats, social networks, online media, and the like. An avatar can be created based on a photograph of a person through a certain transformation. However, maintaining high image quality and avoiding unwanted artifacts during the transformation process can be challenging. Additionally, conventional AI models used for generation of avatars may not consistently recognize the presence of objects such as accessories, clothing items, mustaches, and so forth in a user image. As a result, the avatars generated by these AI models based on the user image may not accurately represent the person depicted in the user image.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method for generating personalized avatars using text description of features is provided. The method may commence with receiving a first image. The first image may include a face of a person. The method may proceed with acquiring a text. The text may include a first prompt for stylization of the first image. The method may further include generating, based on the first image, a second prompt concerning the face in the first image. Upon generating the second prompt, the method may proceed with combining the first prompt and the second prompt into a third prompt. The method may further include encoding the third prompt into a text embedding and encoding the first image into an image embedding.

The method may proceed with randomly generating a first noise for the image embedding and adding the first noise to the image embedding to obtain a noisy image embedding. The method may further include (a) providing the noisy image embedding, the text embedding and the image embedding to a first neural network to generate a second noise for the image embedding. The first neural network may be trained to denoise the noisy image embedding towards a true data distribution for further embeddings corresponding to further images.

The method may proceed with (b) modifying the noisy image embedding by applying a linear transformation based on the second noise. The operations (a) and (b) may be repeated a predetermined number of times until the noisy image embedding converges to a further image embedding belonging to the true data distribution for the further embeddings corresponding to the further images. The method may further include decoding, using a second neural network, the noisy image embedding into a second image. The second image may include the face stylized according to the third prompt.

According to another embodiment, a system for generating personalized avatars using text description of features is provided. The system may include at least one processor and a memory storing processor-executable codes. The processor can be configured to implement the operations of the above-mentioned method for generating personalized avatars using text description of features.

According to yet another aspect of the disclosure, there is provided a non-transitory processor-readable medium, which stores processor-readable instructions. When the processor-readable instructions are executed by a processor, they cause the processor to implement the above-mentioned method for generating personalized avatars using text description of features.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
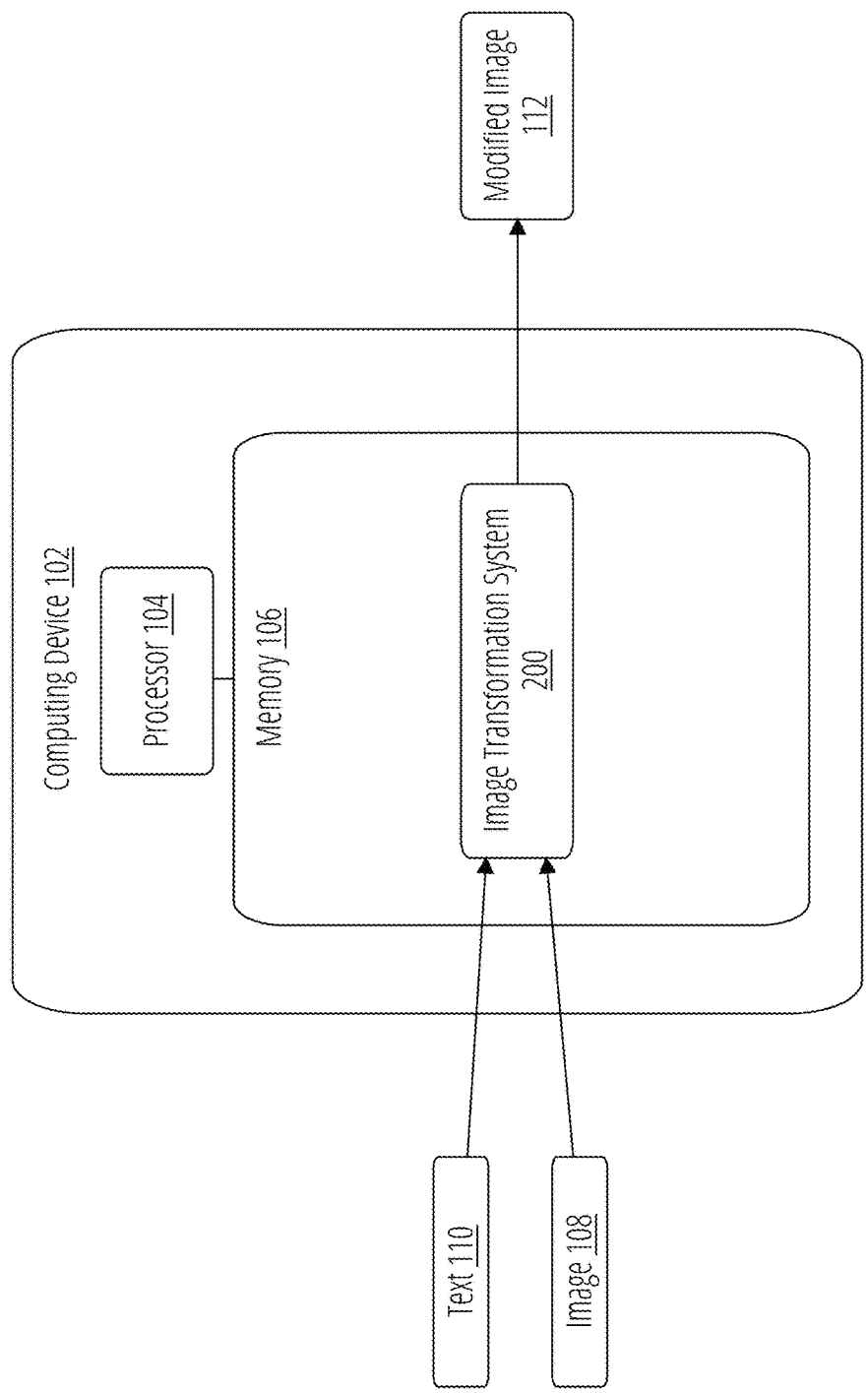
FIG. 1 shows an example environment, in which systems and methods for generating personalized avatars using text description of features can be implemented, according an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The terms "can" and "may" shall mean "possibly be, but not limited to be."

This disclosure describes systems and methods for generating personalized avatars using text description of features. Specifically, certain embodiments of the systems and methods enable stylization of photographs by generating stylized avatars of people present in the photographs. The system may receive an image and a text prompt from a user. The image may depict a person. The text may contain instructions for stylizing the person depicted in the image. Upon receiving the image and the text prompt, the system may use one or more classifiers to extract features from the image and add it to the text prompt. In an example embodiment, the one or more classifiers include a Large Language and Vision Assistant (LLaVA). LLaVA is an end-to-end trained large multimodal model that connects a vision encoder and a Large Language Model (LLM) for general purpose visual and language understanding. The visual encoder is configured to extract meaningful representations from visual data. The visual encoder enables understanding of the semantics and context of the images and making accurate predictions of features present in images. The LLM is an AI model that is trained on large sets of data and utilizes machine learning to recognize and generate text.

The features may be associated with specific characteristics of an object, person, or animal present in the image. The example features may include sunglasses, piercings, earrings, types of headwear (e.g., a fancy hat), bandages, and other accessories. LLaVA may be configured to process the image and determine presence of the features in the image.

Based on the determination that the features are present in the image, LLaVA may extract the features from the image and generate a further text prompt associated with the features. Example further text prompts may include, for example, "sunglasses," "nose piercing," "earrings," "beard," "mustache," "fancy hat," and so forth. The text prompt received from the user and the further text prompt provided by LLaVA may be then encoded into a text embedding (e.g., by using Contrastive Language-Image Pre-Training (CLIP)).

The system may then process the image using an image encoder. Specifically, the system may encode the image into an image embedding. Upon generating the image embedding, the system may randomly generate a first noise for the image embedding. Then, the system may add the first noise to the image embedding to obtain a noisy image embedding.

The system may further process the noisy image embedding and the text embedding by using a first neural network. The first neural network may be trained to denoise the noisy image embedding towards a true data distribution for further embeddings corresponding to further images. In an example embodiment, the first neural network may include a U-net neural network. The U-net neural network may use a stable diffusion model. The stable diffusion model is a latent text-to-image diffusion model configured to generate photorealistic images based on any text input. The system may further modify the noisy image embedding by applying a linear transformation based on the second noise. Specifically, the U-net neural network is configured to predict the second noise, which is then used to refine the noisy image embedding by the linear transformation. This process is iterated multiple times for further refinement.

Upon modifying the noisy image embedding, the system may decode the noisy image embedding into a modified image. The decoding may be performed by an image decoder using a second neural network. As a result, the modified image that includes the face stylized according to the prompt may be generated.

Existing solutions for generating digital avatars are typically unable to identify features on a face or body of the person in the image properly. The resulting avatar may lack the features specific to the person in the image or the features can be identified and generated incorrectly. The system described in the present disclosure uses AI to identify features and provide text description of the features. The text description is then used as a text prompt for AI models for generating personalized avatars.

Referring now to the drawings, FIG. 1 shows an example environment 100, in which systems and methods for generating personalized avatars using text description of features can be implemented. The environment 100 may include a computing device 102. The computing device 102 may include a processor 104 and a memory 106. The memory 106 may store an image transformation system 200 as processor-executable instructions.

The computing device 102 may include, but is not limited to, a notebook computer or a desktop computer including a graphic processing unit. In some embodiments, the computing device 102 can be a part of cloud-based computing resource(s) shared by multiple users. The cloud-based computing resource(s) can include hardware and software available at a remote location and accessible over a data network. The cloud-based computing resource(s) can be dynamically reallocated based on demand. The cloud-based computing resource(s) may include one or more server farms/clusters including a collection of computer servers that can be co-located with network switches and/or routers.

The image transformation system 200 can receive an image 108 (also referred to as a first image) and a text 110. In an example embodiment, the image 108 and the text 110 may be received from a computing device 102 of a user. Image 108 may depict the face and the head of a person. The text 110 may include a prompt for stylizing the face and the head of the person to generate an image of an avatar of the person depicted in image 108. The image transformation system 200 can generate a modified image 112 (also referred to as a second image) based on the image 108 and the text 110. In various embodiments, the prompts in the text 110 may include, for example, the following prompts: "generate an avatar in an anime style," "add snow to the background," "do not modify the background," and so forth. Modified image 112 may include an avatar of person depicted in image 108. The avatar can be stylized according to the prompt in text 110. The image 108 and the text 110 can be provided by the user of the computing device 102 via a user interface associated with the computing device 102. Details of the image transformation system 200 are described in FIG. 2.

Figure 2:
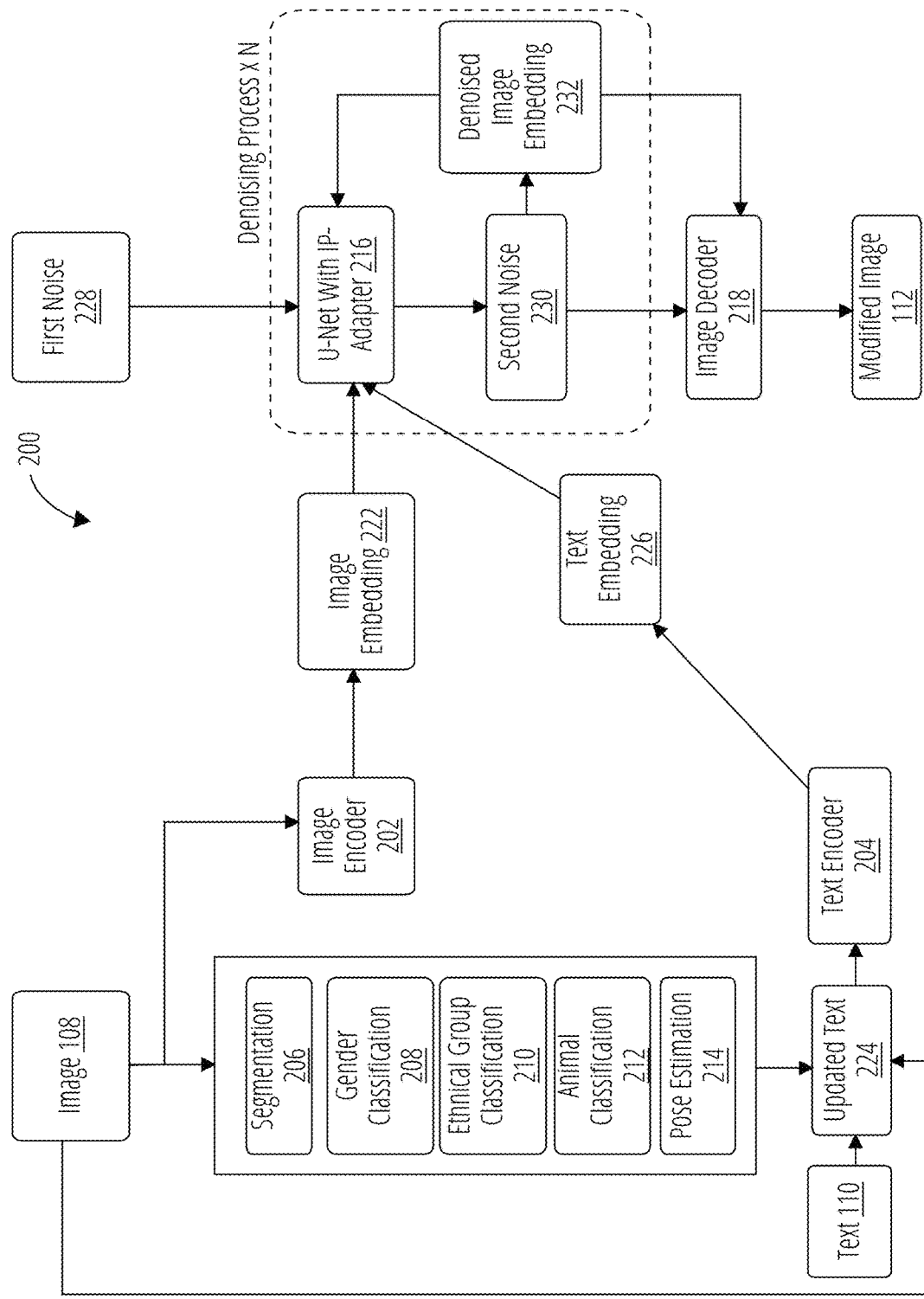
FIG. 2 is a block diagram showing modules of an image transformation system, according to an example embodiment.

FIG. 2 is a block diagram showing modules of an image transformation system 200, according to an example embodiment. The image transformation system 200 may include a plurality of modules including an image encoder 202, a text encoder 204, a segmentation 206, a gender classification 208, an ethnic group classification 210, an animal classification 212, a pose estimation 214, a U-net with IP-adapter 216, an image decoder 218, and an image caption model 220. In other embodiments, the image transformation system 200 may include fewer or more modules than shown in FIG. 2. In an example embodiment, operations of any of the modules of the image transformation system 200 may be performed by a processor 104 shown in FIG. 1.

The image encoder 202 may receive the image 108 in one of various computer readable formats and encode the image 108 into an image embedding 222. The image embedding 222 may refer to a compressed, continuous, and typically lower-dimensional representation of the image 108 in a latent space. In some embodiments, the image encoder 202 can be a convolutional neural network (CNN), for example, CLIP, or other types of networks designed to extract meaningful features from images.

The segmentation 206 may analyze the image 108 to determine portions of the image 108. The gender classification 208 may analyze the image 108 to determine a gender of a person present in the image 108. The ethnic group classification 210 may analyze the image 108 to determine an ethnic group of the person. The animal classification 212 may analyze the image 108 to determine a type and/or a breed of an animal present in the image 108. The pose estimation 214 (such as DensePose) may predict a pose of the person in the image 108, for example, whether the person is facing away or facing the camera.

The image transformation system 200 may further include one or more models for detecting further features of the person present in the image 108, such as an age, a skin tone, a hair color, a hairstyle, and so forth. In various embodiments, the segmentation 206, the gender classification 208, the ethnic group classification 210, the animal classification 212, and the pose estimation 214 can be implemented as pretrained neural networks.

The image 108 may be further provided to the image caption model 220. The image caption model 220 may process the image 108 to generate text description of features present in the image 108. In an example embodiment, the image caption model 220 includes LLaVA. LLaVA may be configured to process the image 108 and predict, based on the image 108, the text description of features present in the image 108. The text description may include an indication that a person depicted in image 108 wears headwear, glasses, piercings, earrings, and so forth. The text description may also include an indication that a person depicted in image 108 has a beard, mustache, long hair, no hair, short hair, a braid, and so forth. The text description may also include details of the features, for example a type and color of the headwear (a hat, a baseball cap, and the like), a color of the hair of the person, a type and color of earrings, and so forth. The text description can be used to extend the text 110 to form updated text 224.

Accordingly, the features determined by the gender classification 208, the ethnic group classification 210, the animal classification 212, and the pose estimation 214, as well as by the image caption model 220, can be added to text 110 to form the updated text 224. The example features added to the text 110, may include "an African young woman facing the camera," "a Caucasian man facing away from the camera," "a girl raising her right hand," "a bearded man wearing a blue baseball cap and sunglasses," and so forth. For example, if original text 110 includes "woman portrayed in an anime style" and the ethnic group classification 210 determines that the image 108 includes an African woman, the text 110 can be modified to provide the updated text 224 including "an African woman in anime style." The updated text 224 can be provided to the text encoder 204.

The text encoder 204 may transform the updated text 224 into a text embedding 226. The text embedding 226 may refer to a numerical representation of a text in a latent space. The latent space of the text embedding 226 aligns with the latent space of the image embedding 222 generated by the image encoder 202. The text encoder 204 can be CLIP or other networks designed to transform the text into text embeddings. The text embedding 226 may include information concerning the features extracted by the gender classification 208, the ethnic group classification 210, the animal classification 212, the pose estimation 214, and the image caption model 220 since the updated text 224 contains this information.

The image embedding 222 and the text embedding 226 may be provided to the U-net with IP-adapter 216. Furthermore, the image transformation system 200 can generate a first noise 228 and provide the first noise 228 to the U-net with IP-adapter 216. This first noise 228 typically consists of randomly generated Gaussian noise for a specific section of the image 108. The first noise 228 can be processed by the U-net with IP-adapter 216.

The U-net with IP-adapter 216 may include a U-net and an Input Processing Adapter (IP adapter). The U-net may include cross-attention layers to integrate the text embedding 226 and the image embedding 222. The U-net is a neural network trained to predict a second noise 230. The U-net may use a stable diffusion model for obtaining the second noise 230. The stable diffusion model is a latent text-to-image diffusion model configured to generate photorealistic images based on any text input. The IP adapter can be an additional module or component that modifies how the input data is processed before being fed to the U-net. Combining the U-Net with the IP adapter allows incorporating additional inputs and control mechanisms to enhance the image processing capabilities of the U-net. The IP adapter can process the image embedding 222 to extract useful information or modify the image embedding 222 to ensure that the U-net generates the correct output.

In some embodiments, the image transformation system 200 can generate different first noise 228 (and, correspondently, second noise 230 for various portions of the image 108), thereby allowing specific regions of the image 108 to be modified differently. This targeted approach ensures that some areas of the image 108 are altered less or more than others, thus enabling the application of different styles to specific sections based, for example, on the prompts provided in the text 110.

The image transformation system 200 may utilize the second noise 230 to generate a denoised image embedding 232. The denoised image embedding 232 can then be processed by U-net with IP-adapter 216 to update the second noise 230, which in turn can be used to update the denoised image embedding 232. This iterative process (denoising process) of predicting the second noise 230 and updating the denoised image embedding 232 can be repeated several times (e.g., five, or N times) towards a true data distribution for further embeddings corresponding to further images. Thus, the iterative process progressively aligns the denoised image embedding with the desired data distribution and achieves high-quality stylization.

After the iterative denoising steps, the denoised image embedding 232 is provided to the image decoder 218. The image decoder 218 processes the refined denoised image embedding 232 to reconstruct a modified image 112 that aligns with the stylistic instructions while preserving the key features of the original image. Modified image 112 may include an avatar of the person present in image 108 and the features extracted by the gender classification 208, the ethnic group classification 210, the animal classification 212, and the pose estimation 214, and by the image caption model 220.

Figure 3:
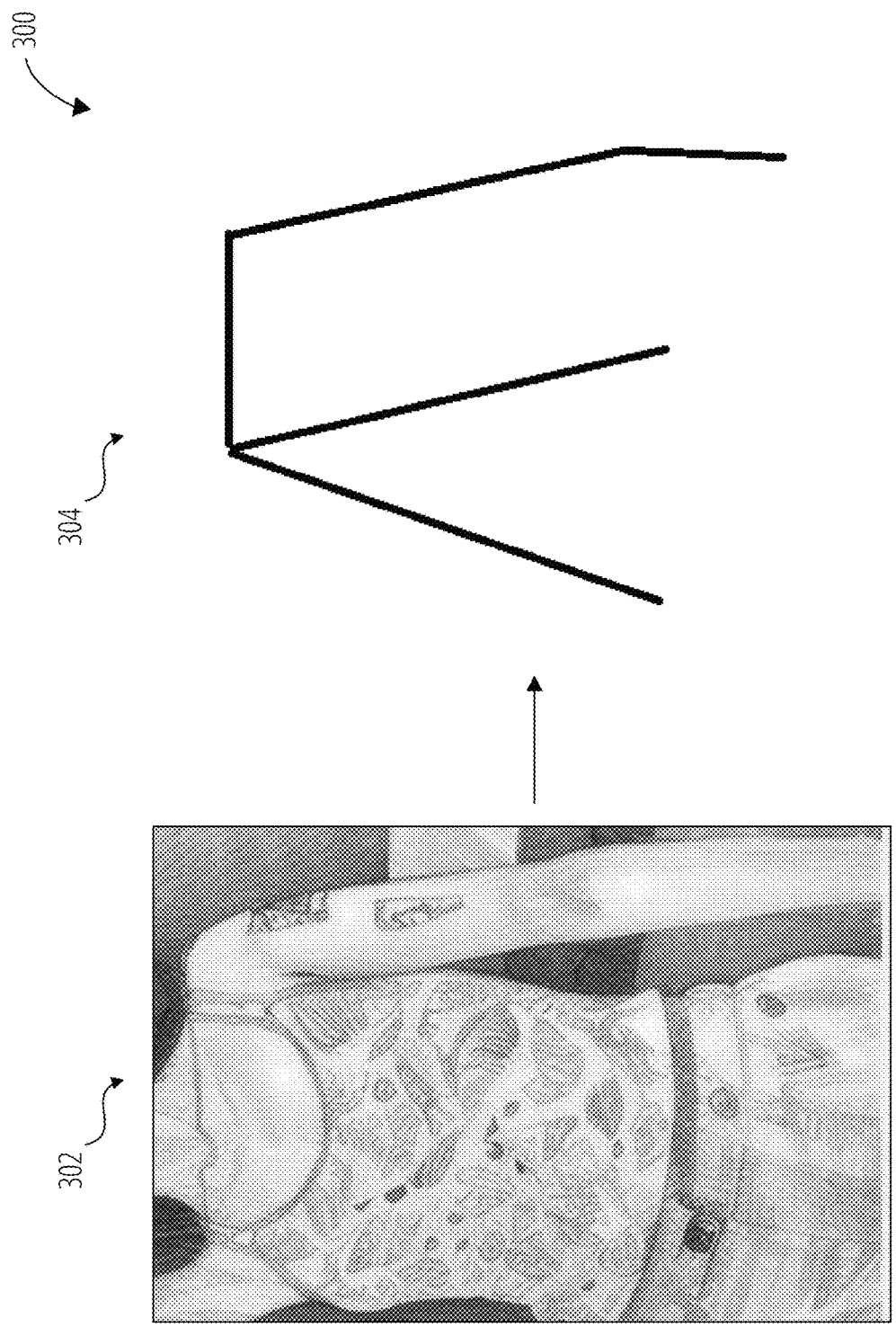
FIG. 3 is a schematic diagram showing an example image and a corresponding skeleton, according to an example embodiment.

FIG. 3 is a schematic diagram 300 showing an example image 302 and a corresponding skeleton 304, according to an example embodiment. The pose estimation 214 (shown in FIG. 2) may include a neural network that generates the skeleton 304 from the image 302. Points in the skeleton 304 can be assigned colors indicating a coordinate of the points in a horizontal direction from the point of view of the camera. In some embodiments, the skeleton 304 can be generated by a pose estimation model such as DensePose.

The pose estimation 214 may include a model that determines the pose of the person in image 302. For example, if the coordinate of the left shoulder is less than the coordinate of the right shoulder, the person is facing forward. If the shoulders are not visible, the model may analyze the hips. If the coordinate of the left hip is smaller than that of the right hip, the person is facing forward. On the contrary, if the coordinate of the right shoulder (or hip) is smaller than that of the left one, the person is facing backwards.

In example of FIG. 3, the coordinate of the left shoulder is less than the coordinate of the right shoulder. It means that the person is facing forward. Accordingly, if original text 110 (shown in FIG. 1) includes "woman in anime style," the text 110 can be modified to "woman in anime style facing front."

Figure 4:
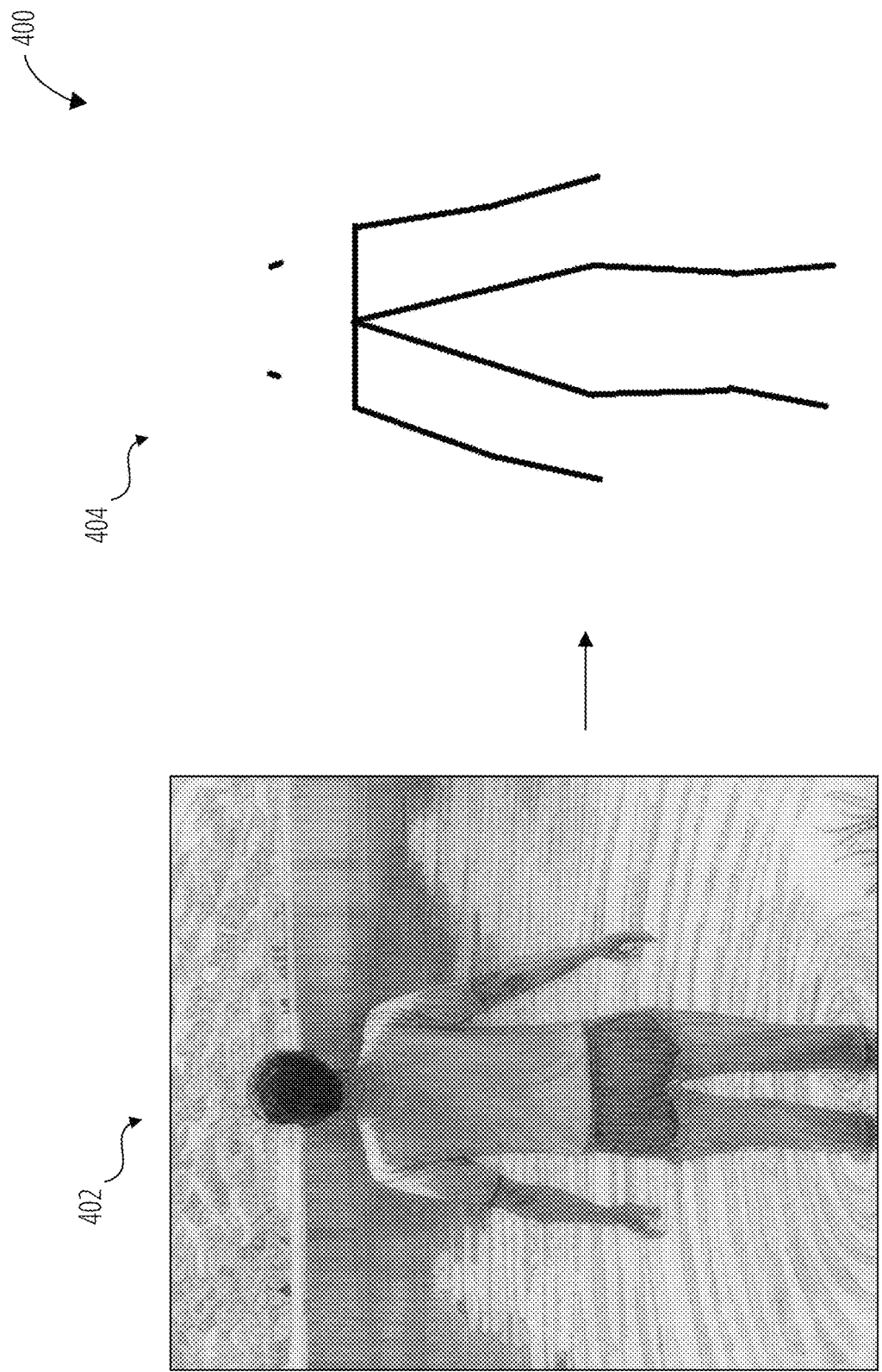
FIG. 4 is a schematic diagram showing an example image and a corresponding skeleton, according to an example embodiment.

FIG. 4 is a schematic diagram 400 showing an example image 402 and a corresponding skeleton 404, according to an example embodiment. In the image 402, a person is shown in full length. In the corresponding skeleton 404, the left shoulder and the right shoulder have the same coordinate in the horizontal direction from the point of view of the camera. However, the coordinate of the right hip is smaller than the coordinate of the left hip. It means that the person is facing backwards. Accordingly, if the original text 110 includes "a man in anime style," the text 110 can be modified to "body of a man in anime style viewed from behind."

Figure 5:
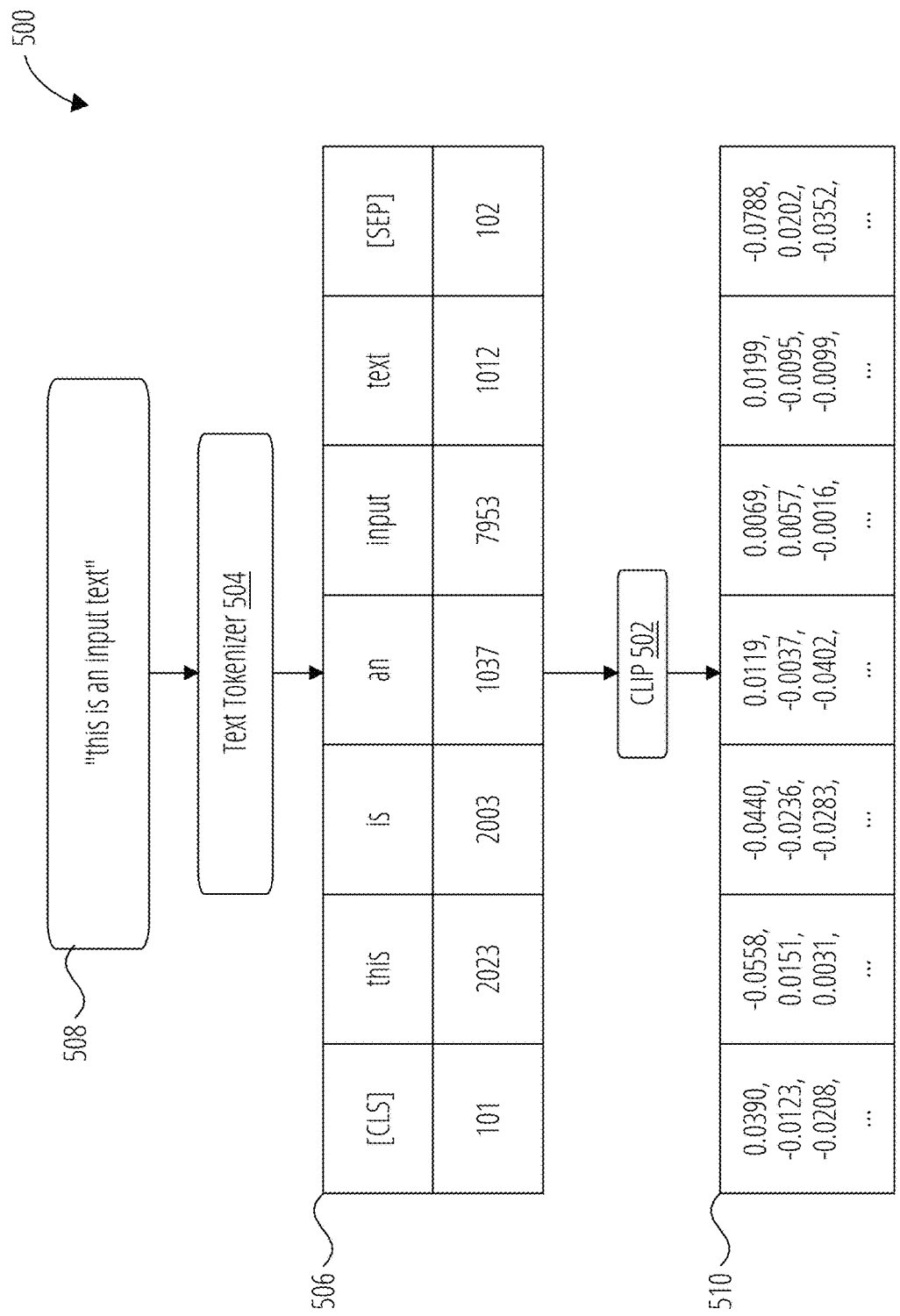
FIG. 5 is a block diagram showing details of a text encoder, according to an example embodiment.

FIG. 5 is a block diagram 500 showing details of a text encoder that performs converting text into text embedding (shown in FIG. 2), according to an example embodiment. In the example of FIG. 5, CLIP 502 is used as a text encoder 204 shown in FIG. 2.

The system of the present disclosure can modify the text (e.g., text instructions received from the user) before encoding the text into CLIP 502 by first passing the text through a text tokenizer 504. This modification ensures that the ethnicity, gender, age, person's pose (e.g., facing the camera or not), and other characteristics of the person are accurately taken into account. To obtain this information from the image, one or more classifiers are used to determine a person's ethnicity, gender, and age. A pose estimator, such as DensePose, can also be employed to predict a person's position in the scene, which helps maintain spatial accuracy in the final stylized image.

The text tokenizer 504 may generate text tokens 506 from raw text 508 (for example, text 110 shown in FIG. 1). Then, the text tokens 506 can be provided to the CLIP 502 to generate text embeddings 510.

Figure 6:
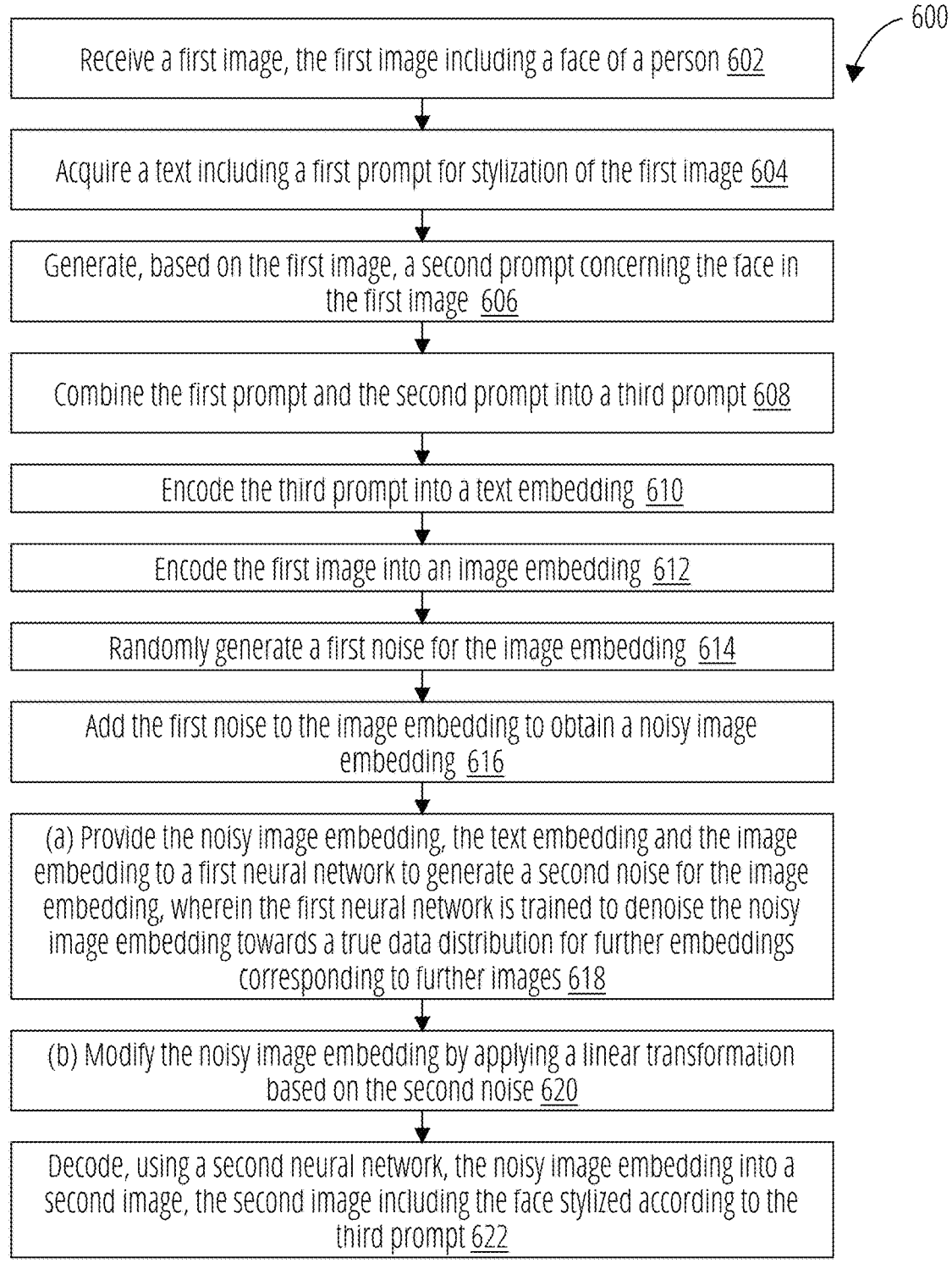
FIG. 6 illustrates a method for generating personalized avatars using text description of features, according to an example embodiment.

FIG. 6 is a flow chart showing a method 600 for generating personalized avatars using text description of features, according to an example embodiment. In some embodiments, the operations of the method 600 may be combined, performed in parallel, or performed in a different order. The method 600 may also include additional or fewer operations than those illustrated. The method 600 may be performed by processing logic that comprises hardware (e.g., decision making logic, dedicated logic, programmable logic, and microcode), software (such as software run on a general-purpose computer system or a dedicated machine), or a combination of both.

The method 600 may commence in block 602 with receiving a first image. The first image may include the face of a person. In block 604, the method 600 may proceed with acquiring a text that may include a first prompt for stylization of the first image. In an example embodiment, the first prompt may include an indication to generate an avatar for the person. For example, the first prompt may include an instruction to "generate an avatar for a girl in the picture."

The method may proceed in block 606 with generating a second prompt concerning the face in the first image. The second prompt may be generated based on the first image. In an example embodiment, the second prompt may be generated by a third neural network trained to obtain a text description of an image. In an example embodiment, the third neural network may include LLaVA. LLaVA may be configured to process the first image and determine presence of at least one feature in the first image. The at least one feature may be associated with specific characteristics of an object, person, or animal present in the image. In some example embodiments, the at least one feature of the person may include one or more of the following: an ethnicity, a gender, an age, an orientation of body with respect to a plane of the first image, and the like. The example at least one feature may include sunglasses, piercings, earrings, types of headwear (e.g., a fancy hat), bandages, and other accessories.

In an example embodiment, the second prompt may include an indication of a type of a headwear that the person is wearing in the first image. In some example embodiments, the second prompt may include an indication that the person is wearing an object obscuring at least a part of the face. In a further example embodiment, the second prompt may include an indication that the person is wearing a piece of personal ornamentation on the head.

In an example embodiment, the second prompt provided by the third neural network upon processing of the first image may include a text description of the at least one feature of the person.

In block 608, the method 600 may include combining the first prompt and the second prompt into a third prompt. In block 610, the method 600 may proceed with encoding the third prompt into a text embedding.

In block 612, the method 600 may include encoding the first image into an image embedding. In block 614, the method 600 includes randomly generating a first noise for the image embedding. In an example embodiment, the first noise may include a Gaussian noise. The method 600 may proceed in block 616 with adding the first noise to the image embedding to obtain a noisy image embedding.

In block 618, the method 600 may include operation (a) of providing the noisy image embedding, the text embedding and the image embedding to a first neural network to generate a second noise for the image embedding. In an example embodiment, the first neural network may include a U-net neural network. The U-net neural network may use a stable diffusion model. The first neural network may be trained to denoise the noisy image embedding towards a true data distribution for further embeddings corresponding to further images. In block 620, the method 600 may include operation (b) of modifying the noisy image embedding by applying a linear transformation based on the second noise. Operations (a) and (b) may be repeated a predetermined number of times until the noisy image embedding converges to a further image embedding belonging to the true data distribution for the further embeddings corresponding to the further images.

In block 622, the method 600 may include decoding, using a second neural network, the noisy image embedding into a second image. The second image may include the face stylized according to the third prompt. Specifically, the stylization may include providing the at least one feature in a stylized format on the second image.

Figure 7:
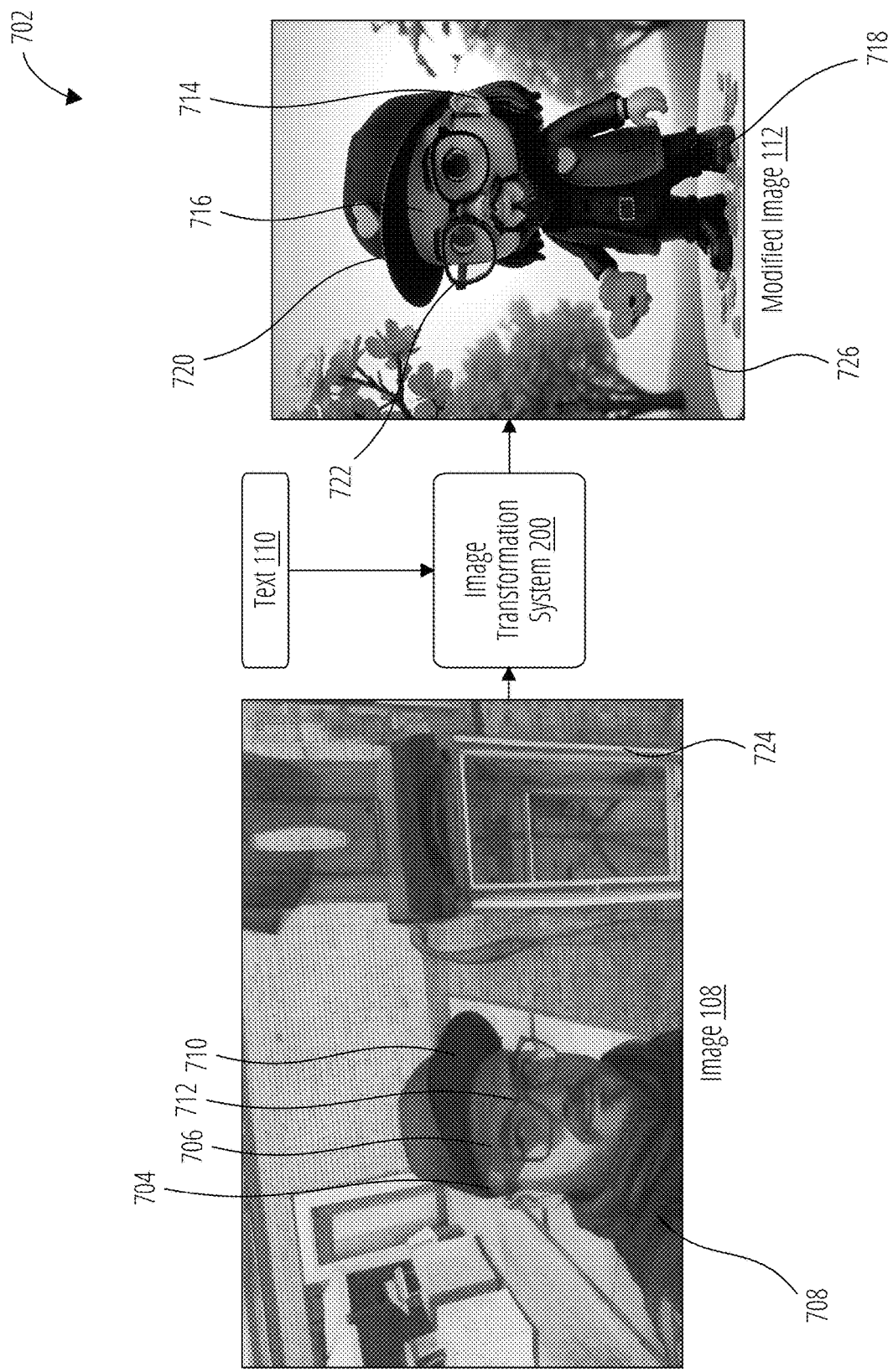
FIG. 7 is a schematic diagram illustrating processing of an image by an image transformation system, according to an example embodiment.

FIG. 7 is a schematic diagram 702 illustrating processing of an image 108 by an image transformation system 200, according to an example embodiment. The image 108 may be provided to the image transformation system 200. The image 108 may be a picture of a person 704. Specifically, the image 108 may show a face 706 and at least a portion of a body 708 of the person 704. The person 704 may have a cap 710 and glasses 712.

Text 110 may be provided to the image transformation system 200 along with or after providing the image 108 to the image transformation system 200. The text 110 may include a prompt for stylization of the image 108. The prompt may be, for example, "please generate an avatar of the person in the picture in anime style."

The image transformation system 200 may process the image 108 and the text 110 as described with reference to FIG. 2 and FIG. 6. Upon processing the image 108 and the text 110, the image transformation system 200 may provide a modified image 112. The modified image 112 may include an avatar 714 corresponding to the person 704 depicted in the image 108. Specifically, the avatar 714 may have a face 716 with features resembling the features of the face 706 of the person 704, such as an eye color, a hair color, a beard, mustache, and the like. Moreover, the image transformation system 200 may generate, for the avatar 714, objects depicted in the image 108 of the person. Such objects may include a cap 720 and glasses 722.

Furthermore, though the image 108 shows only a portion of the body 708 of the person, a whole body 718 of the avatar 714 may be generated and depicted on the modified image 112.

The avatar 714 having the face 716 and the body 718, as well as the cap 720 and the glasses 722 of the avatar 714, may be generated in the anime style, as requested in the prompt provided in the text 110.

In an example embodiment, the image transformation system 200 may process a background 724 of the image 108. Based on the processing, the image transformation system 200 may generate a background 726 of the modified image 112. The background 726 may be generated in the anime style, as requested in the prompt provided in the text 110.

Figure 8:
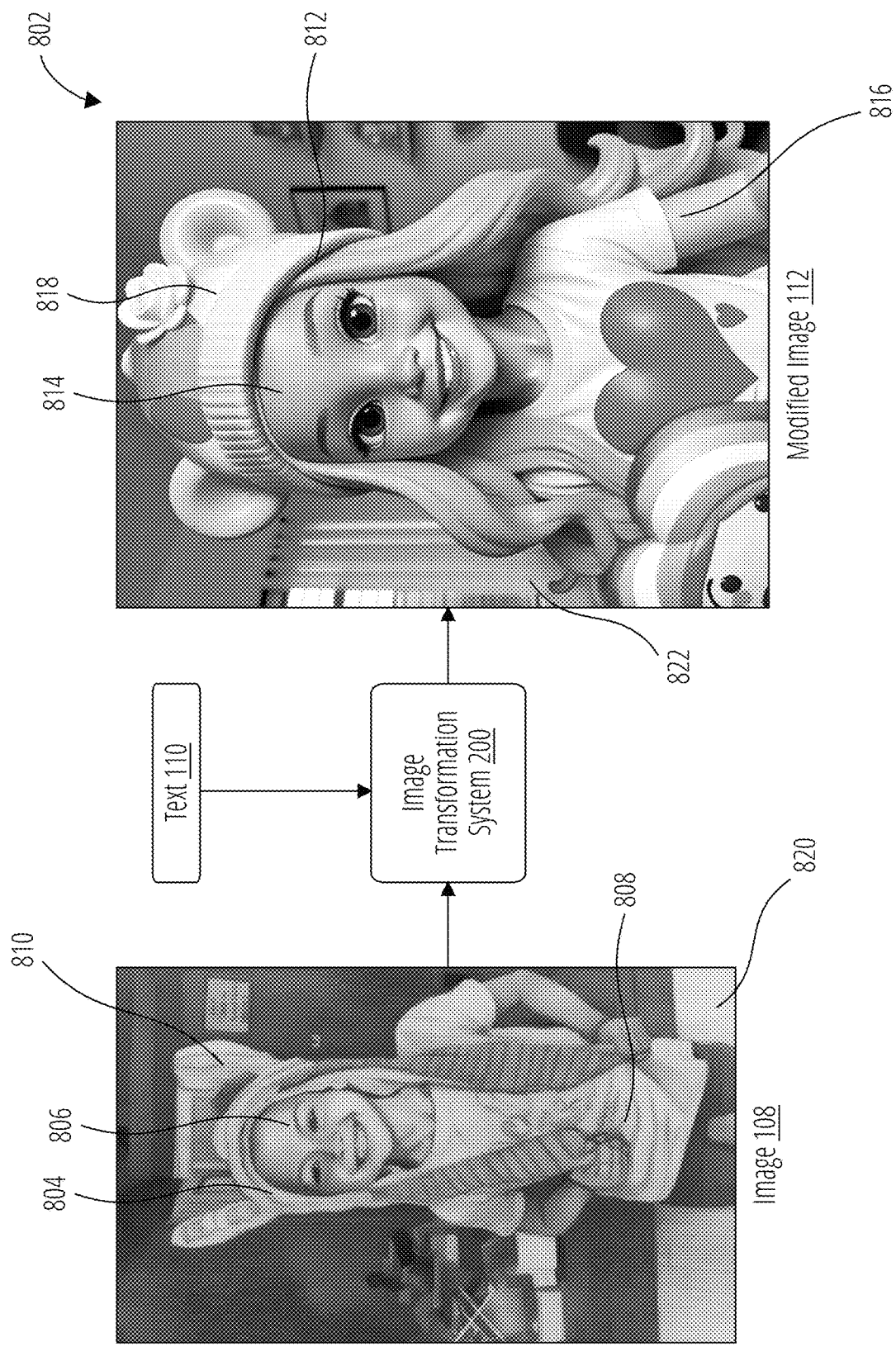
FIG. 8 is a schematic diagram illustrating processing of an image by an image transformation system, according to an example embodiment.

FIG. 8 is a schematic diagram 802 illustrating processing of an image 108 by an image transformation system 200, according to an example embodiment. The image 108 may be provided to the image transformation system 200. The image 108 may be a picture of a person 804. Specifically, the image 108 may show a face 806 and a body 808 of the person 804. The person 804 may have a hat 810.

Text 110 may be provided to the image transformation system 200 along with or after providing the image 108 to the image transformation system 200. The text 110 may include a prompt for stylization of the image 108. The prompt may be, for example, "please generate an avatar of the girl in the picture in anime style."

The image transformation system 200 may process the image 108 and the text 110 as described with reference to FIG. 2 and FIG. 6. Upon processing the image 108 and the text 110, the image transformation system 200 may provide a modified image 112. The modified image 112 may include an avatar 812 corresponding to the person 804 depicted in the image 108. Specifically, the avatar 812 may have a face 814 with features resembling the features of the face 806 of the person 804, such as an eye color, a hair color, and the like. Moreover, the image transformation system 200 may generate, for the avatar 812, objects depicted in the image 108 of the person. Such objects may include a hat 818. The avatar 812 having the face 814 and the body 816, as well as the hat 818 of the avatar 812, may be generated in the anime style, as requested in the prompt provided in the text 110.

In an example embodiment, the image transformation system 200 may process a background 820 of the image 108. Based on the processing, the image transformation system 200 may generate a background 822 of the modified image 112. The background 822 may be generated in the anime style, as requested in the prompt provided in the text 110.

Figure 9:
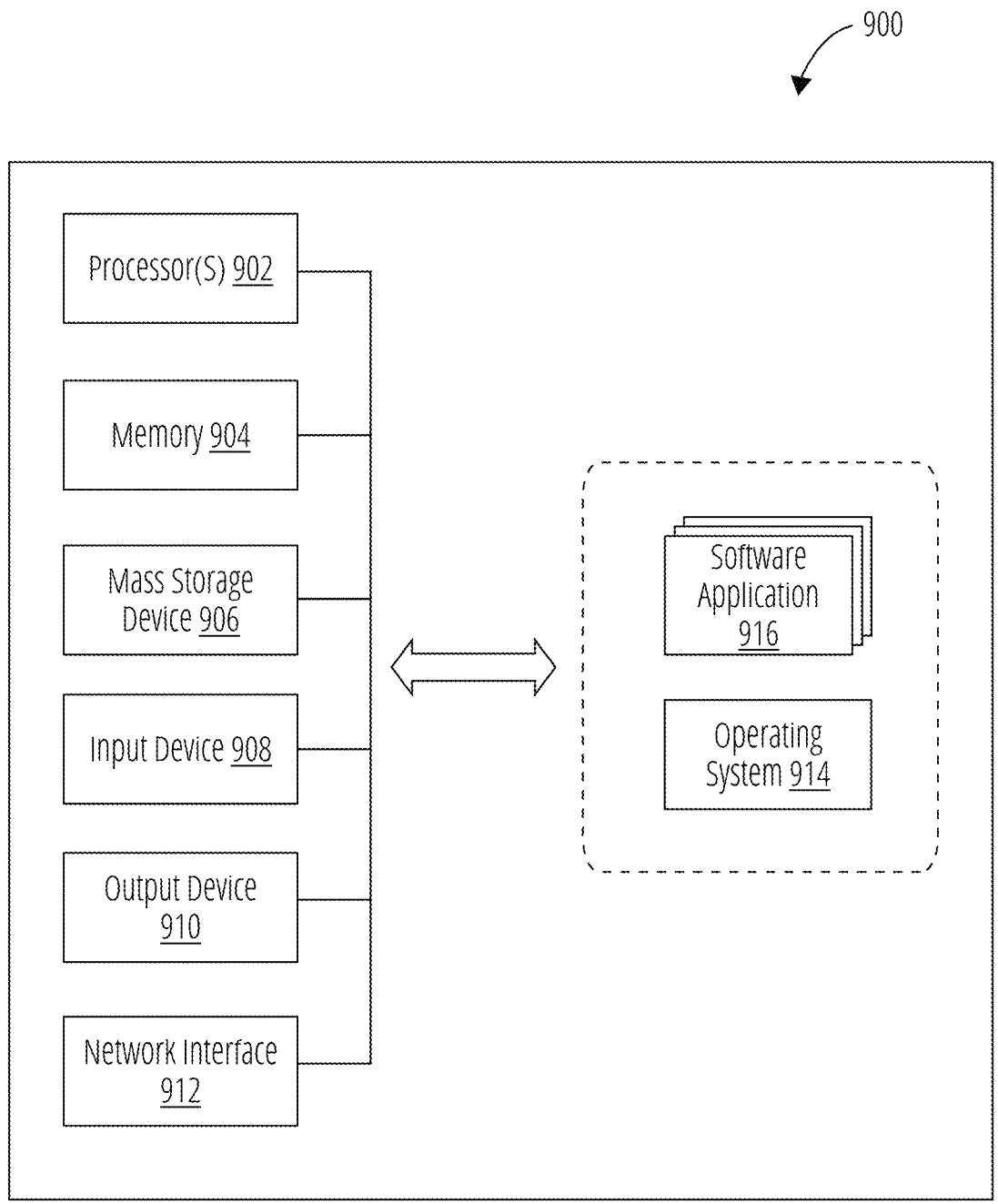
FIG. 9 is a high-level block diagram illustrating an example computer system, within which a set of instructions for causing a machine to perform any one or more of the methodologies discussed herein can be executed.

FIG. 9 is a high-level block diagram illustrating an example computer system 900, within which a set of instructions for causing the machine to perform any one or more of the methodologies discussed herein can be executed. The computer system 900 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 900 is an example of computing device 102 shown in FIG. 1. Notably, FIG. 9 illustrates just one example of the computer system 900 and, in some embodiments, the computer system 900 may have fewer elements/modules than shown in FIG. 9 or more elements/modules than shown in FIG. 9.

The computer system 900 may include one or more processor(s) 902, a memory 904, one or more mass storage devices 906, one or more input devices 908, one or more output devices 910, and a network interface 912. The processor(s) 902 are, in some examples, configured to implement functionality and/or process instructions for execution within the computer system 900. For example, the processor(s) 902 may process instructions stored in the memory 904 and/or instructions stored on the mass storage devices 906. Such instructions may include components of an operating system 914 or software applications 916. The computer system 900 may also include one or more additional components not shown in FIG. 9, such as a body, a power supply, a power supply, a global positioning system (GPS) receiver, and so forth.

The memory 904, according to one example, is configured to store information within the computer system 900 during operation. The memory 904, in some example embodiments, may refer to a non-transitory computer-readable storage medium or a computer-readable storage device. In some examples, the memory 904 is a temporary memory, meaning that a primary purpose of the memory 904 may not be long-term storage. The memory 904 may also refer to a volatile memory, meaning that the memory 904 does not maintain stored contents when the memory 904 is not receiving power. Examples of volatile memories include random access memories (RAM), dynamic random access memories (DRAM), static random access memories (SRAM), and other forms of volatile memories known in the art. In some examples, the memory 904 is used to store program instructions for execution by the processor(s) 902. The memory 904, in one example, is used by software (e.g., the operating system 914 or the software applications 916). Generally, the software applications 916 refer to software Applications suitable for implementing at least some operations of the methods for input image and video transformation as described herein.

The mass storage devices 906 may include one or more transitory or non-transitory computer-readable storage media and/or computer-readable storage devices. In some embodiments, the mass storage devices 906 may be configured to store greater amounts of information than the memory 904. The mass storage devices 906 may further be configured for long-term storage of information. In some examples, the mass storage devices 906 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 908, in some examples, may be configured to receive input from a user through tactile, audio, video, or biometric channels. Examples of the input devices 908 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 900, or components thereof.

The output devices 910, in some examples, may be configured to provide output to a user through visual or auditory channels. The output devices 910 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 910 may also include a touchscreen, a presence-sensitive display, or other input/output capable displays known in the art.

The network interface 912 of the computer system 900, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi Networks®, among others. The network interface 912 may be a network interface card, such as an Ethernet card, an optical transceiver, a radio frequency transceiver, or any other type of device that can send and receive information.

The operating system 914 may control one or more functionalities of the computer system 900 and/or components thereof. For example, the operating system 914 may interact with the software applications 916 and may facilitate one or more interactions between the software applications 916 and components of the computer system 900. As shown in FIG. 9, the operating system 914 may interact with or be otherwise coupled to the software applications 916 and components thereof. In some embodiments, the software applications 916 may be included in the operating system 914. In these and other examples, virtual modules, firmware, or software may be part of the software applications 916.

Thus, systems and methods for generating personalized avatars using text description of features have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method comprising:
receiving a first image, the first image including a face of a person;
acquiring a text including a first prompt for stylization of the first image;
generating, based on the first image, a second prompt concerning the face in the first image;
extracting, from the first image, using a pretrained neural network, at least one feature of a person present in the first image, the at least one feature including one or more of the following: an ethnicity of the person, a gender of the person, an age of the person, and an orientation of body of the person with respect to a plane of the first image;
adding the at least one feature and the second prompt to the text to obtain an updated text;
encoding the updated text into a text embedding;
encoding the first image into an image embedding;
randomly generating a first noise for the image embedding;
adding the first noise to the image embedding to obtain a noisy image embedding;
(a) providing the noisy image embedding, the text embedding and the image embedding to a first neural network to generate a second noise for the image embedding, wherein the first neural network is trained to denoise the noisy image embedding towards a true data distribution for further embeddings corresponding to further images;
(b) modifying the noisy image embedding by applying a linear transformation based on the second noise; and decoding, using a second neural network, the noisy image embedding into a second image, the second image including the face stylized according to the updated text.

2. The method of claim 1, wherein operations (a) and (b) are repeated a predetermined number of times until the noisy image embedding converges to a further image embedding belonging to the true data distribution for the further embeddings corresponding to the further images.

3. The method of claim 1, wherein the second prompt is generated by a third neural network trained to obtain a text description of an image.

4. The method of claim 1, wherein the second prompt includes an indication of a type of a headwear that the person is wearing in the first image.

5. The method of claim 1, wherein the second prompt includes an indication that the person is wearing an object obscuring at least a part of the face.

6. The method of claim 1, wherein the second prompt includes an indication that the person is wearing a piece of personal ornamentation on a head.

7. The method of claim 1, wherein the first prompt includes an indication to generate an avatar for the person.

8. The method of claim 1, wherein the first noise includes a Gaussian noise.

9. A computing device comprising:
a processor; and
a memory storing instructions that, when executed by the processor, configure the computing device to:
receive a first image, the first image including a face of a person;
acquire a text including a first prompt for stylization of the first image;
generate, based on the first image, a second prompt concerning the face in the first image;
extract, from the first image, using a pretrained neural network, at least one feature of a person present in the first image, the at least one feature including one or more of the following: an ethnicity of the person, a gender of the person, an age of the person, and an orientation of body of the person with respect to a plane of the first image;
add the at least one feature and the second prompt to the text to obtain an updated text;
encode the updated text into a text embedding;
encode the first image into an image embedding;
randomly generate a first noise for the image embedding;
add the first noise to the image embedding to obtain a noisy image embedding;
(a) provide the noisy image embedding, the text embedding and the image embedding to a first neural network to generate a second noise for the image embedding, wherein the first neural network is trained to denoise the noisy image embedding towards a true data distribution for further embeddings corresponding to further images;
(b) modify the noisy image embedding by applying a linear transformation based on the second noise; and
decode, using a second neural network, the noisy image embedding into a second image, the second image including the face stylized according to the updated text.

10. The computing device of claim 9, wherein operations (a) and (b) are repeated a predetermined number of times until the noisy image embedding converges to a further image embedding belonging to the true data distribution for the further embeddings corresponding to the further images.

11. The computing device of claim 9, wherein the second prompt is generated by a third neural network trained to obtain a text description of an image.

12. The computing device of claim 9, wherein the second prompt includes an indication of a type of a headwear that the person is wearing in the first image.

13. The computing device of claim 9, wherein the second prompt includes an indication that the person is wearing an object obscure at least a part of the face.

14. The computing device of claim 9, wherein the second prompt includes an indication that the person is wearing a piece of personal ornamentation on a head.

15. The computing device of claim 9, wherein the first prompt includes an indication to generate an avatar for the person.

16. A non-transitory computer-readable storage medium, the computer-readable storage medium including instructions that, when executed by a computing device, cause the computing device to:
receive a first image, the first image including a face of a person;
acquire a text including a first prompt for stylization of the first image;
generate, based on the first image, a second prompt concerning the face in the first image;
extract, from the first image, using a pretrained neural network, at least one feature of a person present in the first image, the at least one feature including one or more of the following: an ethnicity of the person, a gender of the person, an age of the person, and an orientation of body of the person with respect to a plane of the first image;
add the at least one feature and the second prompt to the text to obtain an updated text;
encode the updated text into a text embedding;
encode the first image into an image embedding;
randomly generate a first noise for the image embedding;
add the first noise to the image embedding to obtain a noisy image embedding;
(a) providing the noisy image embedding, the text embedding and the image embedding to a first neural network to generate a second noise for the image embedding, wherein the first neural network is trained to denoise the noisy image embedding towards a true data distribution for further embeddings corresponding to further images;
(b) modify the noisy image embedding by applying a linear transformation based on the second noise; and
decode, using a second neural network, the noisy image embedding into a second image, the second image including the face stylized according to the updated text.

* * * * *